United States Patent
Tseng et al.

(10) Patent No.: US 8,874,953 B2
(45) Date of Patent: Oct. 28, 2014

(54) SYSTEM AND METHOD OF CLOUD TESTING AND REMOTE MONITORING FOR INTEGRATED CIRCUIT COMPONENTS IN SYSTEM VALIDATION

(71) Applicant: Taiwan Memory Qualification Center Corporation, Taipei (TW)

(72) Inventors: Jack Tseng, Taipei (TW); David S. Lin, Taipei (TW); Shao-Kuei Wu, Taipei (TW)

(73) Assignee: Taiwan Memory Qualification Center Corporation, Taipei (TW)

( * ) Notice: Subject to any disclaimer, the term of this patent is extended or adjusted under 35 U.S.C. 154(b) by 199 days.

(21) Appl. No.: 13/692,092

(22) Filed: Dec. 3, 2012

(65) Prior Publication Data

US 2014/0115395 A1    Apr. 24, 2014

(30) Foreign Application Priority Data

Oct. 23, 2012 (TW) .............................. 101139069 A

(51) Int. Cl.
G06F 11/00 (2006.01)
H04L 29/08 (2006.01)
G06F 11/22 (2006.01)

(52) U.S. Cl.
CPC .............. *G06F 11/006* (2013.01); *H04L 29/08* (2013.01); *G06F 11/22* (2013.01)
USPC ....................................................... 714/4.1

(58) Field of Classification Search
CPC ......................... G06F 11/3006; G06F 11/0748
See application file for complete search history.

(56) References Cited

U.S. PATENT DOCUMENTS

| 7,149,887 B2 * | 12/2006 | Morrison et al. ................. 713/1 |
| 2006/0143430 A1 * | 6/2006 | Morrison et al. ................. 713/1 |
| 2012/0166605 A1 * | 6/2012 | Chou ............................ 709/223 |
| 2014/0156832 A1 * | 6/2014 | Stanko et al. ................. 709/224 |

* cited by examiner

*Primary Examiner* — Christopher McCarthy
(74) *Attorney, Agent, or Firm* — Shook, Hardy & Bacon LLP

(57) ABSTRACT

In a method and system for cloud testing and remote monitoring of an IC component during validation of a computerized system connected to a cloud server via a wide area network, upon determining that a unique system code of a system platform and a unique component code of the IC component transmitted from the computerized system in response to execution of an identification operating system (OS) program and a driver from the cloud server match identification data, the cloud server transmits a corresponding test OS and a corresponding test program to the computerized system such that the computerized system produces test data corresponding to the corresponding test program in response to execution of the corresponding test OS and test program.

12 Claims, 4 Drawing Sheets

SYSTEM AND METHOD OF CLOUD TESTING AND REMOTE MONITORING FOR INTEGRATED CIRCUIT COMPONENTS IN SYSTEM VALIDATION

CROSS-REFERENCE TO RELATED APPLICATION

This application claims priority to Taiwanese Application No. 101139069, filed on Oct. 23, 2012, the contents of which are hereby incorporated by reference.

BACKGROUND OF THE INVENTION

1. Field of the Invention

The invention relates to testing of an integrated circuit component in a computerized system, and more particularly to a system and a method for cloud testing and remote monitoring of integrated circuit components in computerized system validation.

2. Description of the Related Art

To ensure the quality of manufactured information products, such as personal computers, notebook computers, flat panel computers, smart phones, smart TVs, etc., the information products must undergo a series of tests, e.g., stability tests related to a specific component of different brands and different models, before being released from the factory. For example, since a memory is one of the major components of a personal computer, the memory becomes a key component on which stability and reliability of an operating system of the personal computer depends. Therefore, before the personal computer leaves the factory, it is required for the manufacturer thereof to bring the personal computer to a specific test lab so as to carry out compatibility and reliability tests on the memory in the personal computer by professional testers.

Currently, different test software programs have been developed for common memory tests, wherein each test software program comes with a dedicated test interface to be manually operated by the testers to create a test result that is recorded in writing. With such manual operation, unintentional human errors may occur during operation of the test interface. Further, each tester is able to handle a limited number of personal computers under test, e.g., three to five personal computers.

Moreover, a test lab with a sufficient test capacity or an additional test lab is required for component testing of mass-produced information apparatuses with such manual testing setup. In this case, greater costs and time are needed for conducting the tests, and commercial secrets of the information apparatuses might be jeopardized during testing.

SUMMARY OF THE INVENTION

Therefore, an object of the present invention is to provide a method and system for cloud testing and remote monitoring of an integrated circuit component during validation of a computerized system that includes the integrated circuit component to overcome the aforesaid drawbacks of the prior art.

According to one aspect of the present invention, there is provided a system for cloud testing and remote monitoring of an integrated circuit (IC) component during validation of a computerized system that includes the IC component. The IC component has a unique component code. The computerized system further includes a system platform that has a unique system code. The system of the present invention comprises a cloud server. The cloud server includes a database unit and a processing unit. The database unit stores identification data, which includes a plurality of system identification codes and a plurality of component identification codes, an identification operating system (OS) program, a driver, a plurality of test OSs associated respectively with the system identification codes, and a plurality of test programs. Each of the component identification codes is associated with at least one of the test programs. The processing unit is connected electrically to the database unit.

When each of the cloud server and the computerized system establishes a connection with a wide area network, the processing unit of the cloud sever is operable to transmit the identification OS program and the driver stored in the database unit to the computerized system via the wide area network upon establishing a connection with the computerized system in response to receipt of a connection request from the computerized system via the wide area network such that the computerized system is configured to transmit the system code of the system platform and the component code of the IC component to the processing unit of the cloud server via the wide area network in response to execution of the identification OS program and the driver, determine whether a match exists in the identification data stored in the database unit with the system code of the system platform and the component code of the IC component, and if a match exists, transmit one of the test OSs that is associated with a corresponding one of the system identification codes to which the system code of the system platform matches, and at least one of the test programs that is associated with a corresponding one of the component identification codes to which the component code of the IC component matches to the computerized system via the wide area network test such that the computerized system is configured to produce test data corresponding to said at least one of the test programs in response to execution of said one of the test OSs and said at least one of the test programs.

According to another aspect of the present invention, there is provided a method for cloud testing and remote monitoring of an integrated circuit (IC) component during validation of a computerized system, which includes the IC component, using a cloud server. Each of the computerized system and the cloud server establishes a connection with a wide area network. The IC component has a unique component code. The computerized system further includes a system platform that has a unique system code. The cloud server includes a database unit for storing identification data, which includes a plurality of system identification codes and a plurality of component identification codes, an identification operating system (OS) program, a driver, a plurality of test OS programs associated respectively with the system identification codes, and a plurality of test programs. Each of the component identification codes is associated with at least one of the test programs. The method of the present invention comprises the steps of:

a) configuring the computerized system to issue a connection request to the cloud server via the wide area network, and configuring the cloud server to establish a connection with the computerized system via the wide area network in response to the connection request;

b) configuring the cloud server to transmit the identification OS program and the driver to the computerized system via the wide area network such that the computerized system is operable to transmit the system code of the system platform and the component code of the IC component to the cloud server via the wide area network in response to execution of the identification OS program and the driver;

c) configuring the cloud server to determine whether a match exists in the identification data with the system code of the system platform and the component code of the IC component;

d) if a match exists, configuring the cloud server to transmit one of the test OSs that is associated with a corresponding one of the system identification codes to which the system code of the system platform matches, and at least one of the test programs that is associated with a corresponding one of the component identification codes to which the component code of the IC component matches to the computerized system via the wide area network test; and e) configuring the computerized system to execute said one of the test OSs and said at least one of the test programs so as to produce test data corresponding to said at least one of the test program.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
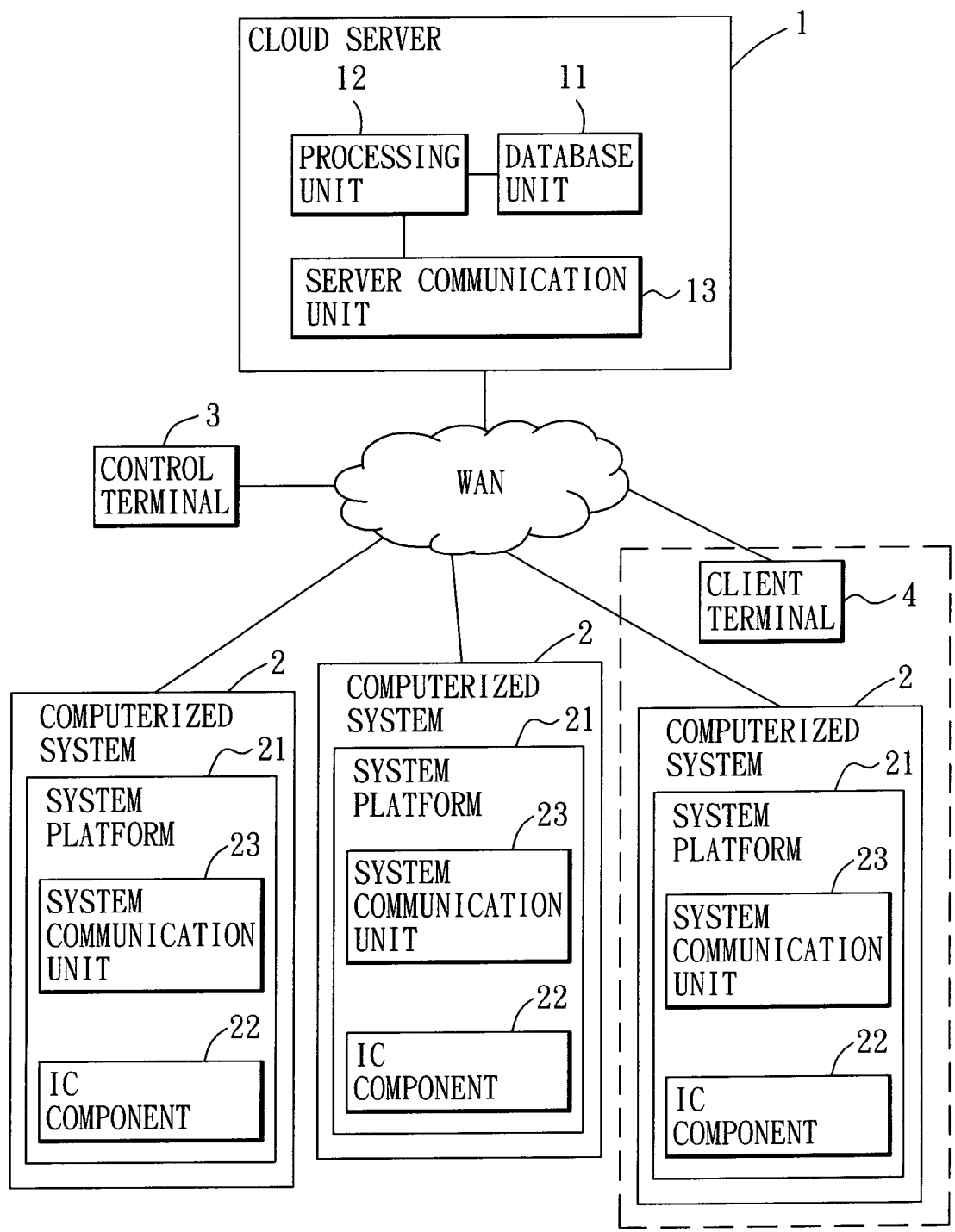
FIG. 1 is a block diagram illustrating a preferred embodiment of a system for cloud testing and remote monitoring of an integrated circuit component during validation of a computerized system that includes the integrated circuit component according to the present invention.

Referring to FIG. 1, the preferred embodiment of a system 100 for cloud testing and remote monitoring of a plurality of integrated circuit (IC) components 22 installed respectively in a plurality of computerized systems 2 during system validation according to the present invention is shown. Each computerized system 2 includes a system platform 21 that has a corresponding IC component 22 and a system communication unit 23 installed thereon. In this embodiment, the computerized systems 2 are personal computers, notebook computers or flat panel computers, but are not limited thereto. For each computerized system 2, the system platform 21 consists of a motherboard, a central processing unit, bridge chips, etc. (no shown), wherein a basic input/output system (BIOS) resident on the motherboard contains a unique system code, which has product model information of the system platform 21 and universally unique identifier (UUID) information, for identifying an identity of the system platform 21. Each IC component 22 has a unique component code. In this embodiment, each IC component 22 is a memory, such as a double-data-rate two synchronous dynamic random access memory (DDR2 SDRAM), a DDR3 SDRAM, a DDR4 SDRAM, a compact flash (CF) memory card, a secure digital (SD) memory card, or a solid state disk (SSD), but is not limited thereto. The memory has a memory component number (also cal led product serial number) that serves as the unique component code. In this embodiment, the system communication unit 23 includes a network interface card. As such, each computerized system 2 establishes a connection with a wide area network (WAN), such as the Internet, using the system communication unit 23 thereof. Thus, the computerized systems 2 are able to be located in different geographic regions of the world, such as Taiwan, China, America, etc.

The system 100 includes a cloud server 1, a control terminal 3, and a plurality of client terminals 4 (only one is shown).

The cloud server 1 includes a database unit 11, a processing unit 12 connected electrically to the database unit 11, and a server communication unit 13 connected electrically to the processing unit 12. The database unit 11 stores identification data, which includes a plurality of system identification codes and a plurality of component identification codes, an identification operating system (OS) program, a driver, a plurality of test OSs associated respectively with the system identification codes, and a plurality of test programs. Each of the component identification codes is associated with at least one of the test programs.

In this embodiment, the database unit 11 is a hard disk, but is not limited thereto. The identification OS program, such as Microsoft Windows PE, is a pre-installed interface program, which is a simplified OS capable of providing basic operating functions for the computerized systems 2. The driver is a universal network driver capable of driving a network interface card (not shown) of the system communication unit 23 of each computerized system 2. Each test OS is a computer OS, such as Windows, Linux, iOS, etc. The test programs serve to provide a 3D image test, a processing speed test, a DVD playing test, a rebooting test, a power-off test, an auto S3 200 cycle test, an auto S4 200 cycle test, a reboot 200 cycle test, etc., for the computerized systems 2. When the computerized systems 2 are notebook computers, the test programs serve to provide tests for video stress (direct3D), hibernation critical only, standby critical only, storage stress, electrothermodynamics (ETD), DOS, solid state disk (SSD) logical block addresses (LBA), etc. In addition, each test program actually incorporates a single executable file or multiple executable files. For example, the auto S3 200 cycle test program is an executable file with additional parameters, such as pwrtest.exe/sleep/c:200/d:30/p:30/h:n/s:3/wttlogname:c:\s3. In addition, the 3D image test incorporates an executable file, such as AUTOIT, and a test software program, such as 3DMark. In this embodiment, the processing unit 12 is a central processing unit. The server communication unit 13 includes a network interface card such that the cloud server 1 establishes a connection with the WAN using the server communication unit 13.

In this embodiment, the control terminal 3, such as a common computer, is connected electrically to the cloud server 1 via the WAN such that the control terminal 3 is operable to control the cloud server 1. In other embodiments, the control terminal 3 can be connected to the cloud server 1 via a local area network.

Each client terminal 4, such as a common computer, is associated with a corresponding computerized system 2, and establishes a connection with the cloud server 1 via the WAN.

Figure 2:
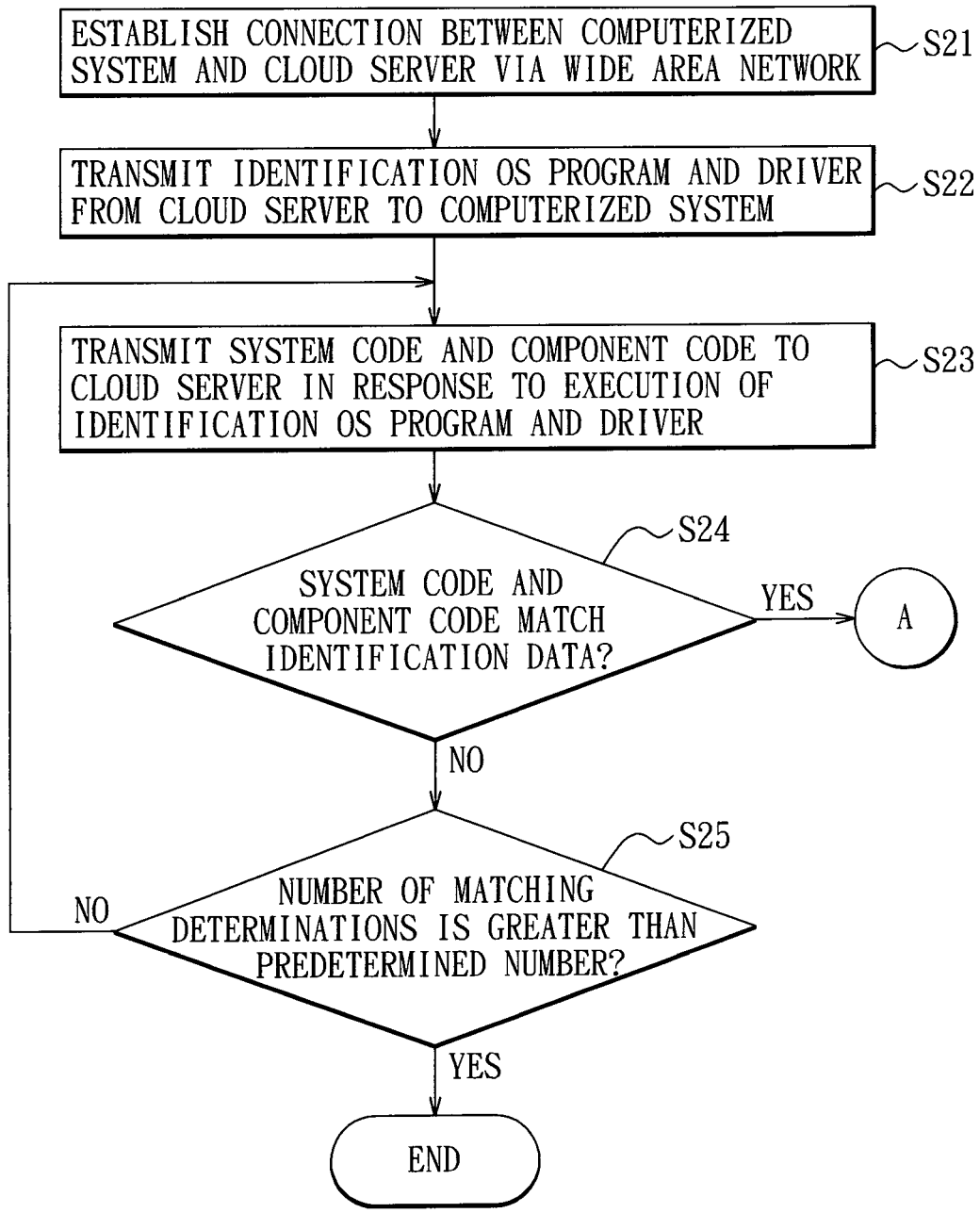
FIGS. 2 to 3 are flow charts illustrating a preferred embodiment of a method for cloud testing and remote monitoring of an integrated circuit component during validation of a computerized system that includes the integrated circuit component according to the present invention.
Figure 3:
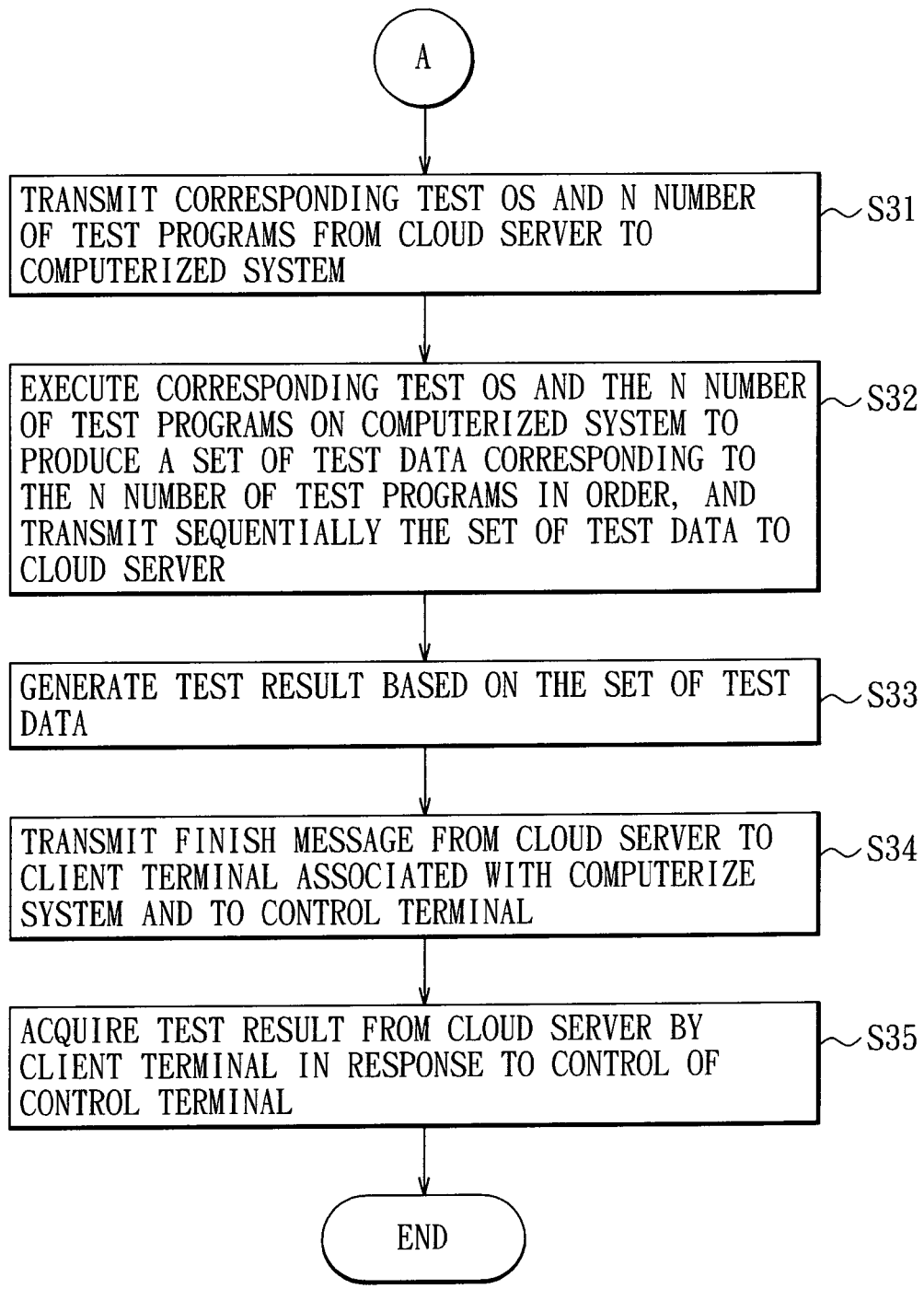

The system 100 of the preferred embodiment is able to perform the same operation for all of the computerized systems 2. The operation of the system 100 for a rightmost computerized system 2 in FIG. 1 will now be illustrated in conjunction with FIGS. 2 and 3, which cooperatively illustrate a flow chart of the preferred embodiment of a method for cloud testing and remote monitoring of an IC component 22 during validation of a computerized system 2 that includes the IC component 2.

In step S21, the computerized system 2 is operable to issue a connection request to the cloud server 1 via the WAN, and the cloud server 1 establishes a connection with the computerized system 2 via the WAN in response to the connection request from the computerized system 2. In this embodiment, the computerized system 2 supports wake-on-LAN or wake-on-WAN functions. As such, the connection request containing an IP address of the computerized system 2 is issued utilizing pre-boot execution environment (PXE).

In step S22, once the connection between the cloud server 1 and the computerized system 2 is established, the cloud server 1 is configured to transmit the identification OS program and the driver to the computerized system 2 via the WAN.

In step S23, after installation of the identification OS program and the driver, the computerized system 2 is operable to read and encrypt the system code of the system platform 21 and the component code of the IC component 22, and to transmit the encrypted system code and the encrypted component code to the cloud server 1 via the WAN in response to execution of the identification OS program and the driver.

In step S24, the processing unit 12 of the cloud system 1 is operable to determine, after decrypting the encrypted system code and the encrypted component code received from the computerized system 2 in step S23, whether the system code and the component code match respectively one of the system identification codes and one of the component identification codes of the identification data stored in the database unit 11. When a match exists, the flow goes to step S31. Otherwise, the flow proceeds to step S25.

In step S25, when the system code and the component code transmitted in step S23 have no match in the identification data, the processing unit 12 of the cloud server 1 is operable to determine whether the number of matching determinations made thereby for the same computerized system 2, i.e., the number of times of performing step S24 for the same computerized system 2, is greater than a predetermined number. If the result is negative, the flow goes back to step S23. When the number of matching determinations made by the processing unit 12 of the cloud server 1 for the same computerized system 2 is greater than the predetermined number, the flow is terminated. In this case, since the computerized system 2 is not identified by the system 100 after the predetermined number of attempts, it is concluded that the system 100 does not support testing for the computerized system 2. At the same time, the cloud server 1 sends a termination message to the control terminal 3 and the client terminal 4.

In step S31, the processing unit 12 of the cloud server 1 is operable to select one of the test OSs that is associated with the system identification code to which the system code of the system platform 21 of the computerized system 2 matches, and a subset of the test programs (N number of test programs) associated with the component identification code to which the component code of the IC component 22 matches, and to transmit said one of the test OSs, the subset of the test programs, and an integrated test interface associated with the subset of the test programs to the computerized system 2 through the server communication unit 13. It should be noted that said one of the test OSs includes a plurality of drivers required for driving hardware components of the system platform 21 of the computerized system 2. For example, said one of the test OSs is a Windows 7 professional OS, and the subset of the test programs includes programs for the auto S3 cycle test, the auto S4 200 cycle test and the 3D image test. At the same time, the processing unit 12 is operable to create a folder in the database unit 11 for storing data related to testing of the computerized system 2.

Figure 4:
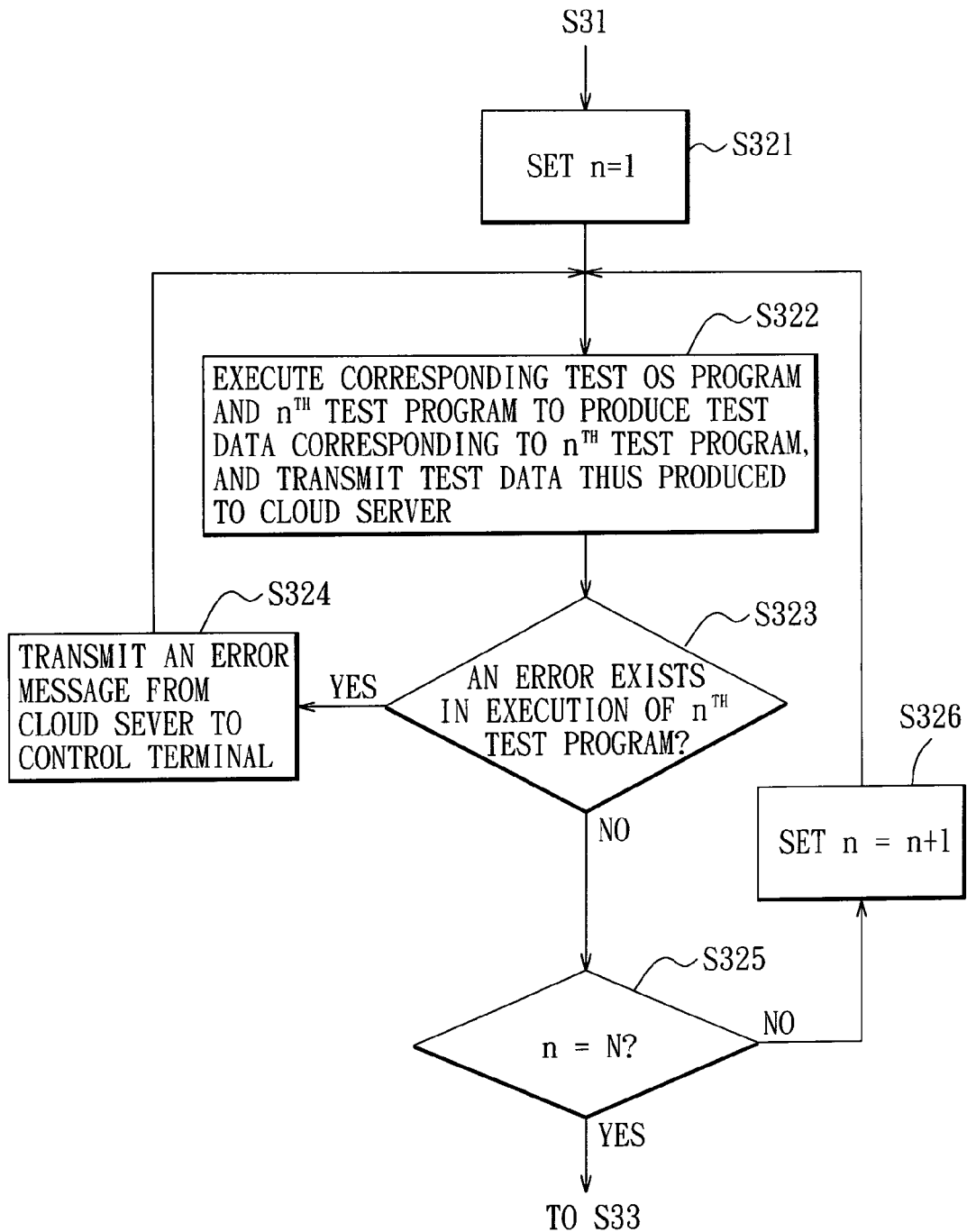
FIG. 4 is a flow chart illustrating how the computerized system executes a corresponding test operating system program and N number of test programs to produce and transmit a set of test data.

In step S32, after installation of said one of the test OSs, the N test programs and the integrated test interface, the computerized system 2 is operable to execute said one of the test OSs and to execute the N test programs in order based on the integrated test interface such that a set of test data corresponding to the N test programs is produced in order and is transmitted sequentially from the computerized system 2 to the cloud server 1. In particular, step S32 further includes sub-steps S321 to S326 as shown in FIG. 4.

In sub-step S321, a variable n is defined for the computerized system 2, and initially, n=1. Then, in sub-step S322, the computerized system 2 is operable to execute said one of the test OSs and an $n^{th}$ test program so as to produce test data corresponding to the $n^{th}$ test program, and to transmit the test data produced thereby to the cloud sever 1 via the WAN in response to execution of said one of the test OSs.

In sub-step S323, the processing unit 12 of the cloud server 1 is operable to determine, based on the test data transmitted from the computerized system 2 in sub-step S322, whether an error exists in execution of the $n^{th}$ test program. If the result is affirmative, the flow proceeds to sub-step S324. Otherwise, the flow goes to sub-step S325. In this embodiment, when the test data corresponding to the $n^{th}$ test program is determined by the processing unit 12 of the cloud sever 1 to be faulty, the processing unit 12 of the cloud sever 1 determines that an error exists in the execution of the $n^{th}$ test program. It should be noted that, in other embodiments, when awaiting time period for receipt of the test data by the cloud sever 1 from the computerized system 2 exceeds a predetermined time period, the processing unit 12 of the cloud sever 1 determines that an error exists in the execution of the $n^{th}$ test program, e.g., the computerized system 2 crashes.

In sub-step S324, when the processing unit 12 of the cloud server 1 determines that an error exists in the execution of the $n^{th}$ test program, the cloud server 1 is operable to transmit an error message to the control terminal 3. Then, the flow goes back to sub-step S322. As such, the cloud server 1 is operable to enable the computerized system 2 to execute said one of the test OSs and the $n^{th}$ test program once again in response to control of the control terminal 3.

In sub-step S325, the processing unit 12 of the cloud server 1 determines whether the variable n is equal to N. If the result is affirmative (i.e., all N test programs have been executed), the flow goes to step S33. In this case, the set of the test data corresponding to the N test programs has been transmitted to the cloud sever 1 and is stored in the folder of the database unit 11. Otherwise, the flow proceeds to sub-step S326, where the variable n is set to be n+1, and the flow goes back to sub-step S322.

In step S33, the processing unit 12 of the cloud server 1 is operable to generate a test result based on the set of test data from the computerized system 2 and stored in the folder of the database unit 11. In this embodiment, the test result is in the form of a PDF file or an HTML file, and is also stored in the folder of the database unit 11.

Then, in step S34, the cloud server 1 transmits a finish message to the control terminal 3 and to the client terminal 4. Finally, in step S35, the control terminal 3 is operable to control the cloud server 1 to permit the client terminal 4 to acquire the test result stored in the folder of the database unit 11. For example, the cloud server 1 is controlled by the control terminal 3 to permit downloading of the test result stored in the folder of the database unit 11 into the client terminal 4.

The following are some of the advantages attributed to the system 100 and method of the present invention:

1. In such a configuration, construction of the test environment for the computerized systems 2 is facilitated by using the cloud server 1, and remote monitoring of the computerized systems 2 by the control terminal 3 can be achieved.

2. By automatically executing the corresponding test programs on each computerized system 2, test efficiency for each computerized system 2 can be enhanced without unintentional human operating mistakes, and test time for each computerized system 2 can be reduced.

3. Since geographical locations of the computerized systems 2 are not limited and since testing of the computerized systems 2 does not need to be performed in a specific test lab, each computerized system 2 can be tested in a factory thereof, thereby ensuring commercial secretes thereof and eliminating shipping costs.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A system for cloud testing and remote monitoring of an integrated circuit (IC) component during validation of a computerized system that includes the IC component, the IC component having a unique component code, the computerized system further including a system platform that has a unique system code, said system comprising:

a cloud server including
a database unit for storing identification data, which includes a plurality of system identification codes and a plurality of component identification codes, an identification operating system (OS) program, a driver, a plurality of test OSs associated respectively with the system identification codes, and a plurality of test programs, each of the component identification codes being associated with at least one of the test programs, and
a processing unit connected electrically to said database unit;

wherein, when each of said cloud server and the computerized system establishes a connection with a wide area network, said processing unit of said cloud sever is operable to
transmit the identification OS program and the driver stored in said database unit to the computerized system via the wide area network upon establishing a connection with the computerized system in response to receipt of a connection request from the computerized system via the wide area network such that the computerized system is configured to transmit the system code of the system platform and the component code of the IC component to said processing unit of said cloud server via the wide area network in response to execution of the identification OS program and the driver,
determine whether a match exists in the identification data stored in said database unit with the system code of the system platform and the component code of the IC component, and
if a match exists, transmit one of the test OSs that is associated with a corresponding one of the system identification codes to which the system code of the system platform matches and at least one of the test programs that is associated with a corresponding one of the component identification codes to which the component code of the IC component matches to the computerized system via the wide area network test such that the computerized system is configured to produce test data corresponding to said at least one of the test programs in response to execution of said one of the test OSs and said at least one of the test programs.

2. The system as claimed in claim 1, wherein the computerized system is configured to further transmit the test data thus produced to said processing unit of said cloud server via the wide area network in response to execution of said one of the test OSs and said at least one of the test programs such that said processing unit of said cloud server generates a test result based on the test data from the computerized system, and stores the test result in said database unit.

3. The system as claimed in claim 2, further comprising a client terminal associated with the computerized system and connected to said cloud server, wherein said cloud server transmits a finish message indicating completion of the validation of the computerized system to said client terminal after generation of the test result.

4. The system as claimed in claim 3, further comprising a control terminal connected to said cloud server for controlling said cloud server to permit said client terminal to acquire the test result stored in said database unit.

5. The system as claimed in claim 4, wherein:
said processing unit of said cloud server is operable to determine, based on the test data from the computerized system, whether an error exists in the execution of said at least one of the test programs on the computerized system;
said processing unit of said cloud server generates the test result upon determining that no error exists in the execution of said at least one of the test programs on the computerized system; and
upon determining that an error exists in execution of said at least one of the test programs on the computerized system, said cloud server is operable to transmit an error message indicating the error to said control terminal and to enable the computerized system to execute said one of the test OSs and said at least one of the test programs once again.

6. The system as claimed in claim 1, wherein the identification OS program is a pre-installed interface program capable of providing basic operating functions for the computerized system.

7. The integrated cloud test system as claimed in claim 1, wherein, when ones of the test programs are associated with the corresponding one of the component identification codes to which the component code of the IC component matches and are transmitted from said cloud server to the computerized system, the computerized system is operable to execute said ones of the test programs in order in response to execution of said one of the test OSs.

8. A method for cloud testing and remote monitoring of an integrated circuit (IC) component during validation of a computerized system, which includes the IC component, using a cloud server, each of the computerized system and the cloud server establishing a connection with a wide area network, the IC component having a unique component code, the computerized system further including a system platform that has a unique system code, the cloud server storing identification data, which includes a plurality of system identification codes and a plurality of component identification codes, an identification operating system (OS) program, a driver, a plurality of test OSs associated respectively with the system identification codes, and a plurality of test programs, each of the component identification codes being associated with at least one of the test programs, said method comprising the steps of:

a) configuring the computerized system to issue a connection request to the cloud server via the wide area network, and configuring the cloud server to establish a connection with the computerized system via the wide area network in response to the connection request;

b) configuring the cloud server to transmit the identification OS program and the driver to the computerized system via the wide area network such that the computerized system is configured to transmit the system code of the system platform and the component code of the IC component to the cloud server via the wide area network in response to execution of the identification OS program and the driver;

c) configuring the cloud server to determine whether a match exists in the identification data with the system code of the system platform and the component code of the IC component;

d) if a match exists, configuring the cloud server to transmit one of the test OSs that is associated with a corresponding one of the system identification codes to which the system code of the system platform matches, and at least one of the test programs that is associated with a corresponding one of the component identification codes to which the component code of the IC component matches to the computerized system via the wide area network; and e) configuring the computerized system to execute said one of the test OSs and said at least one of the test programs so as to produce test data corresponding to said at least one of the test program.

9. The method as claimed in claim 8, further comprising the steps of:

f) configuring the computerized system to transmit the test data to the cloud server via the wide area network in response to execution of said one of the test OSs; and g) configuring the cloud server to generate a test result based on the test data from the computerized system.

10. The method as claimed in claim 9, further comprising the step of:

h) configuring the cloud server to transmit a finish message to a client terminal associated with the computerized system.

11. The method as claimed in claim 9, further comprising the step of:

i) configuring a control terminal connected to the cloud server to control the cloud server to permit a client terminal associated with the computerized system to acquire the test result generated in step g).

12. The method as claimed in claim 9, prior to step g), further comprising the step of f-1) configuring the cloud server to determine, based on the test data from the computerized system, whether an error exists in the execution of step e);

wherein, step g) is performed upon determining in step f-1) that no error exists in the execution of step e).

* * * * *